United States Patent
Hahn et al.

(10) Patent No.: US 11,099,715 B2
(45) Date of Patent: Aug. 24, 2021

(54) METHOD AND DEVICE FOR PROVIDING A USER INTERFACE IN A VEHICLE

(71) Applicant: VOLKSWAGEN AKTIENGESELLSCHAFT, Wolfsburg (DE)

(72) Inventors: Alexander Hahn, Braunschweig (DE); Tomasz Bachorski, Hillerse (DE)

(73) Assignee: Volkswagen AG

( * ) Notice: Subject to any disclaimer, the term of this patent is extended or adjusted under 35 U.S.C. 154(b) by 331 days.

(21) Appl. No.: 14/760,153

(22) PCT Filed: Dec. 11, 2013

(86) PCT No.: PCT/EP2013/076212
§ 371 (c)(1),
(2) Date: Jul. 9, 2015

(87) PCT Pub. No.: WO2014/108268
PCT Pub. Date: Jul. 17, 2014

(65) Prior Publication Data
US 2015/0363057 A1    Dec. 17, 2015

(30) Foreign Application Priority Data
Jan. 10, 2013  (DE) .................... 10 2013 000 880.8

(51) Int. Cl.
*G06F 3/0488*     (2013.01)
*G06F 3/0485*     (2013.01)
(Continued)

(52) U.S. Cl.
CPC ............ *G06F 3/0482* (2013.01); *G06F 3/017* (2013.01); *G06F 3/0485* (2013.01);
(Continued)

(58) Field of Classification Search
None
See application file for complete search history.

(56) References Cited

U.S. PATENT DOCUMENTS

2004/0233238 A1* 11/2004 Lahdesmaki ...... H04N 21/4312
                                                  715/810
2007/0157126 A1*  7/2007 Tschirhart ........... G06F 3/03549
                                                  715/848
(Continued)

FOREIGN PATENT DOCUMENTS

CN    101924892 A    12/2010
DE    19941956 A1     3/2001
(Continued)

OTHER PUBLICATIONS

Search Report for German Patent Application No. 10 2013 000 880.8; dated Jul. 25, 2013.
(Continued)

*Primary Examiner* — Arpan P. Savla
*Assistant Examiner* — Haimei Jiang
(74) *Attorney, Agent, or Firm* — Barnes & Thornburg LLP (57) ABSTRACT

A method for providing a user interface in a vehicle, wherein information that is structured in lists can be displayed, and wherein a list includes list entries and the list entries include elements. At least one subset of the list is displayed on a display surface so that list entries extend on the display surface in a first direction, and at least one subset of elements of this one list entry are displayed so that the elements extend on the display surface in a second direction that differs from the first direction.

16 Claims, 4 Drawing Sheets

(51) Int. Cl.
  *G06F 9/451* (2018.01)
  *G06F 3/045* (2006.01)
  *G06F 3/0482* (2013.01)
  *G06F 3/01* (2006.01)

(52) U.S. Cl.
  CPC ........ *G06F 3/0488* (2013.01); *B60K 2370/11* (2019.05); *B60K 2370/113* (2019.05); *B60K 2370/117* (2019.05); *B60K 2370/143* (2019.05); *B60K 2370/1438* (2019.05); *B60K 2370/1464* (2019.05)

(56) References Cited

U.S. PATENT DOCUMENTS

| | | | | |
|---|---|---|---|---|
| 2008/0211779 | A1* | 9/2008 | Pryor | G06F 3/04847 345/173 |
| 2008/0301587 | A1* | 12/2008 | Baumann | G06F 3/0482 715/841 |
| 2009/0100380 | A1* | 4/2009 | Gardner | G06F 3/0483 715/854 |
| 2010/0211872 | A1* | 8/2010 | Rolston | G06F 9/451 715/702 |
| 2011/0296351 | A1* | 12/2011 | Ewing, Jr. | G06F 3/0483 715/841 |
| 2016/0110033 | A1* | 4/2016 | Wengelnik | B60K 37/06 715/811 |

FOREIGN PATENT DOCUMENTS

| | | |
|---|---|---|
| DE | 102006037156 A1 | 9/2007 |
| DE | 102006032118 A1 | 1/2008 |
| DE | 102008052485 A1 | 4/2010 |
| GB | 2434068 A | 7/2007 |
| KR | 20120037858 A | 4/2012 |

OTHER PUBLICATIONS

Search Report for International Patent Application No. PCT/EP2013/076212; dated Jun. 3, 2014.

Office Action for Chinese Patent Application No. 201380069686.3; dated May 27, 2017.

* cited by examiner

METHOD AND DEVICE FOR PROVIDING A USER INTERFACE IN A VEHICLE

PRIORITY CLAIM

This patent application is a U.S. National Phase of International Patent Application No. PCT/EP2013/076212, filed 11 Dec. 2013, which claims priority to German Patent Application No. 10 2013 000 880.8, filed 10 Jan. 2013, the disclosures of which are incorporated herein by reference in their entirety.

SUMMARY

Illustrative embodiments relate to a method for providing a user interface in a vehicle. The method involves information that is structured in lists being able to be displayed, wherein a list comprises a multiplicity of list entries and a plurality of list entries each comprise a multiplicity of items. In addition, the illustrative embodiments relate to an apparatus for providing a user interface in a vehicle. The apparatus has a display apparatus having a display panel. In addition, the apparatus comprises a memory for storing a list that comprises a multiplicity of list entries that are structured as indicated above. Furthermore, the apparatus comprises an input apparatus that can be operated by a user to alter a displayed subset with list entries and a displayed subset with items by means of an operator control process. In addition, the apparatus comprises a control apparatus that is coupled to the display apparatus, to the memory and to the input apparatus and by means of which the display on the display panel can be controlled on the basis of an operator control process that is performed by means of the input apparatus.

Disclosed embodiments provide a method and an apparatus of a type that can be used to alter the displayed subsets, in a simple manner that is intuitive to the user, so that the operator control process required can be performed as quickly as possible. In addition, the disclosed embodiments demand the least possible degree of attention from the user.

BRIEF DESCRIPTION OF THE DRAWINGS

Disclosed embodiments will now be explained with reference to the drawings.

DETAILED DESCRIPTION OF THE DISCLOSED EMBODIMENTS

In the disclosed method, a display panel is used to display at least one subset of the list such that a multiplicity of list entries in this list extends in a first direction on the display panel. In addition, a list entry from the displayed multiplicity of list entries has at least one subset of the items in this one list entry displayed for it such that the items extend in a second direction on the display panel, which direction is different than the first direction. The disclosed method involves the displayed subset with list entries in the list being altered by a first operator control process by a user such that the list entries in the list are moved through in succession, wherein the first operator control process comprises an operator control movement in the first direction. The disclosed method involves the displayed subset with items in the one list entry being altered by a second operator control process by the user such that the items in the list entry are moved through in succession, wherein the second operator control process comprises an operator control movement in the second direction.

Within the context of the disclosed embodiments, a list is understood to mean a data pool that can be divided into a multiplicity of data units. The data units then correspond to the list entries. The data units can be put into a particular order, so that they are then a list. The first operator control process can be used by the user to move through the list entries in the list in succession. In this case, a subset from the list, i.e. a plurality of list entries, can be reproduced on the display panel with the aid of a graphical object.

By way of example, the list can comprise a multiplicity of audio or video files. In addition, it can relate to entries in a telephone or address book, entries pertaining to a menu in a hierarchic menu structure for the operator control of a device, or other data units that can be combined in a list and presented abstractly with the aid of a graphical object.

The disclosed method allows the user to retrieve the information that is present in the vehicle in structured form particularly simply and intuitively. In this case, two-dimensional operator control is possible that allows list entries to be displayed and selected in one direction and allows the items in the list entry to be displayed and selected in another direction. An operator control process for displaying an item in a particular list entry can therefore advantageously be performed very quickly.

The directions for display of the list entries in the list and display of the items in a list entry can extend in a particular angular range on the display panel. Equally, the operator control processes can be performed in corresponding angular ranges. The direction of the display does not need to exactly match the direction of the operator control movement of the corresponding operator control process in this case. An important aspect of the disclosed method is that the first and second directions for display on the display panel are different and this is identifiable to the user. Accordingly, the only important aspect of the operator control movements of the two operator control processes is that they can be distinguished and can be attributed to a corresponding direction for the display of the list entries and the items. By way of example, the second direction may run essentially at right angles to the first direction. However, it is also possible for the first and second directions to enclose an angle that lies in a range from 70° to 110°.

According to at least one disclosed embodiment of the method, the first operator control process is used to scroll through the list entries in the list and the second operator control process is used to scroll through the items in a list entry in the list. The effect advantageously achieved by this is that operator control can be performed very intuitively for the user.

According to a further disclosed embodiment of the method, at least one operator control process involve(s) a movement on a touch-sensitive surface of an input apparatus being sensed. Such a movement may be sensed in both operator control processes. Alternatively or additionally, at least one operator control process, particularly both operator control processes, involve(s) a movement in a sensing space in front of the display panel being sensed. However, various other operator control processes are also conceivable that are essentially dependent on the type of input apparatus. If the input device allows what is known as gesture recognition, the operator control process can comprise a gesture performed by the hand of a user. If the input device is a mechanical operator control element, the operator control process involves this operator control element being operated, e.g. rotated or pushed for a particular time.

The disclosed method can involve the list entries in the list extending to the rear in the first direction from a perspective point of view. By way of example, they can be shown in staggered succession in a straight line or in an arc from a perspective point of view. In this arrangement, a list entry that is shown in front of another list entry from a perspective point of view at least partly conceals the other list entry. In this way, the list entries can advantageously be sensed such that a relatively large number of list entries can also be shown on a small display panel, as is frequently used in a vehicle. In this case, the user sees only the edges and possibly a portion of the lettering of the list entries, for example, from list entries that are situated to the rear from a perspective point of view.

According to at least one disclosed embodiment of the method, only the list entry that is shown at the front from a perspective point of view has the subset of the items in this one list entry displayed for it. The associated items are not displayed for the other list entries. The effect achieved by this is that the presentation of the structured information does not become too complex. The user can sense the information presented in this manner simply and quickly. The items in a list entry in the list can be shown next to one another, for example. In this case, the result is then, by way of example, a list of list entries that runs to the rear from a perspective point of view and a list of items in the list entry that is frontmost from a perspective point of view, which items are arranged next to one another in one row.

The disclosed control apparatus can be used to actuate the display apparatus such that the display panel is used to display at least one subset of the list such that a multiplicity of list entries in this list extend in a first direction on the display panel, and a list entry from the displayed multiplicity of list entries has at least one subset of the items in this one list entry displayed for it such that the items extend in a second direction on the display panel, which direction is different than the first direction. The displayed subset with list entries in the list can be altered by a first operator control process by the user by means of the control apparatus such that the list entries in the lists are moved through in succession, wherein the first operator control process comprises an operator control movement in the first direction. The displayed subset with items in the one list entry can be altered by a second operator control process by the user by means of the control apparatus such that the items in the list entry are moved through in succession, wherein the second operator control process comprises an operator control movement in the second direction.

In particular, the disclosed apparatus can perform some or all of the method steps described hereinabove.

By way of example, the input apparatus of the disclosed apparatus for providing the user interface comprises a touch-sensitive surface that may be formed on the display panel, for example. Alternatively or additionally, it can have a gesture sensing device. This device can be used by the user to perform the operator control movements in a particularly simple manner and to relate them to the type of display of the list entries in the list and of the items in the list entry. This allows particularly simple and intuitive operator control of the apparatus.

Figure 1:
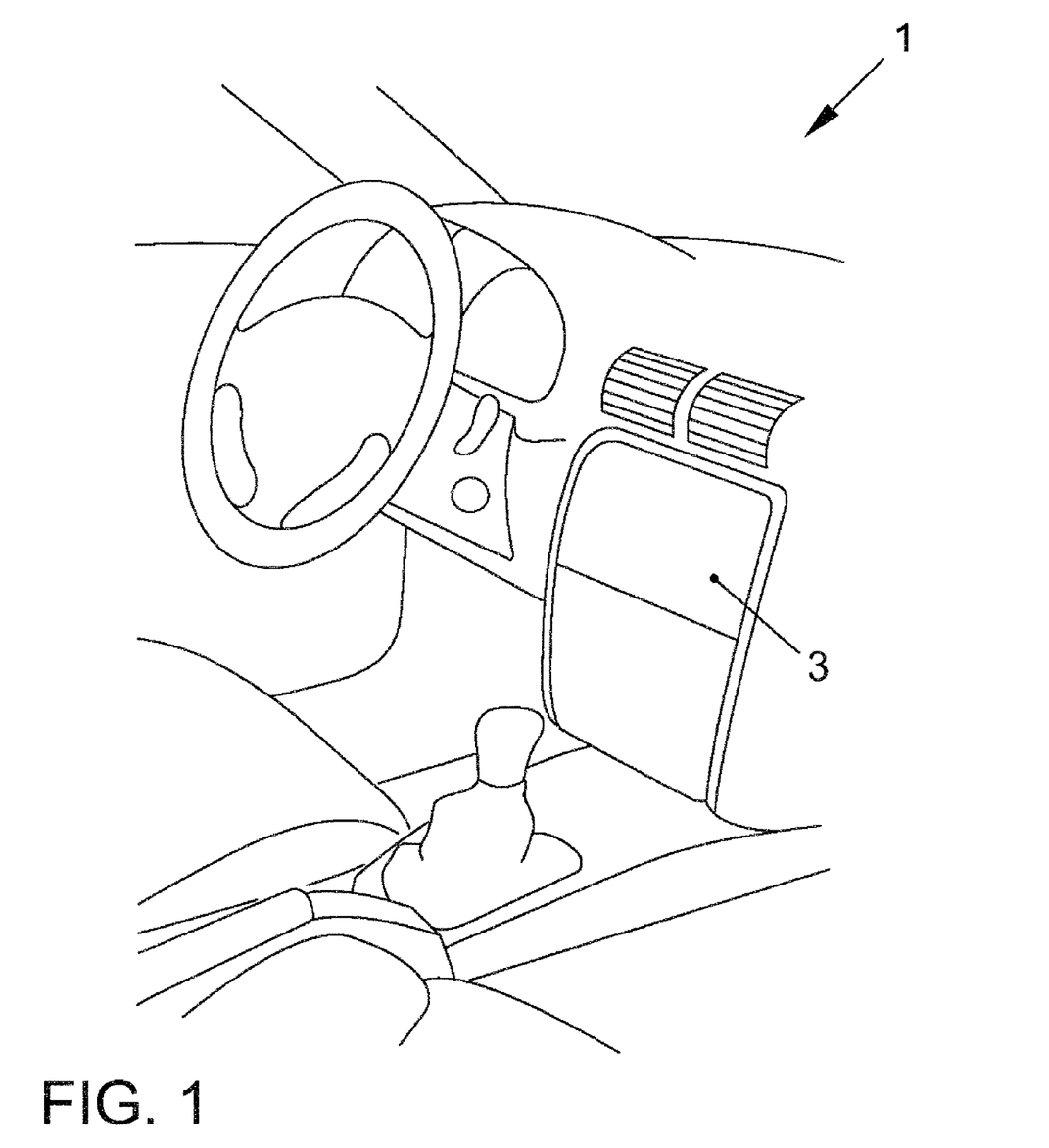
FIG. 1 shows the arrangement of the display panel of an exemplary embodiment of the apparatus in the interior of a vehicle.
Figure 2:
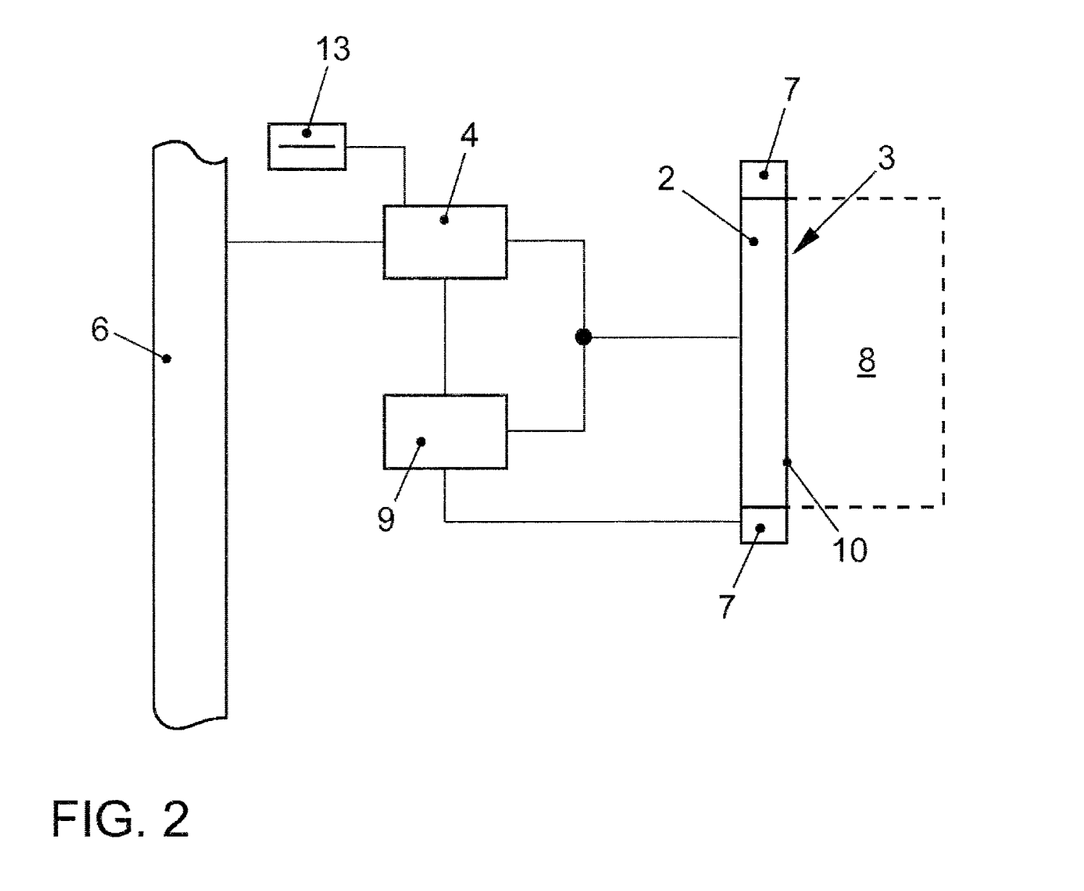
FIG. 2 shows the design of the exemplary embodiment of the apparatus.
Figure 3:
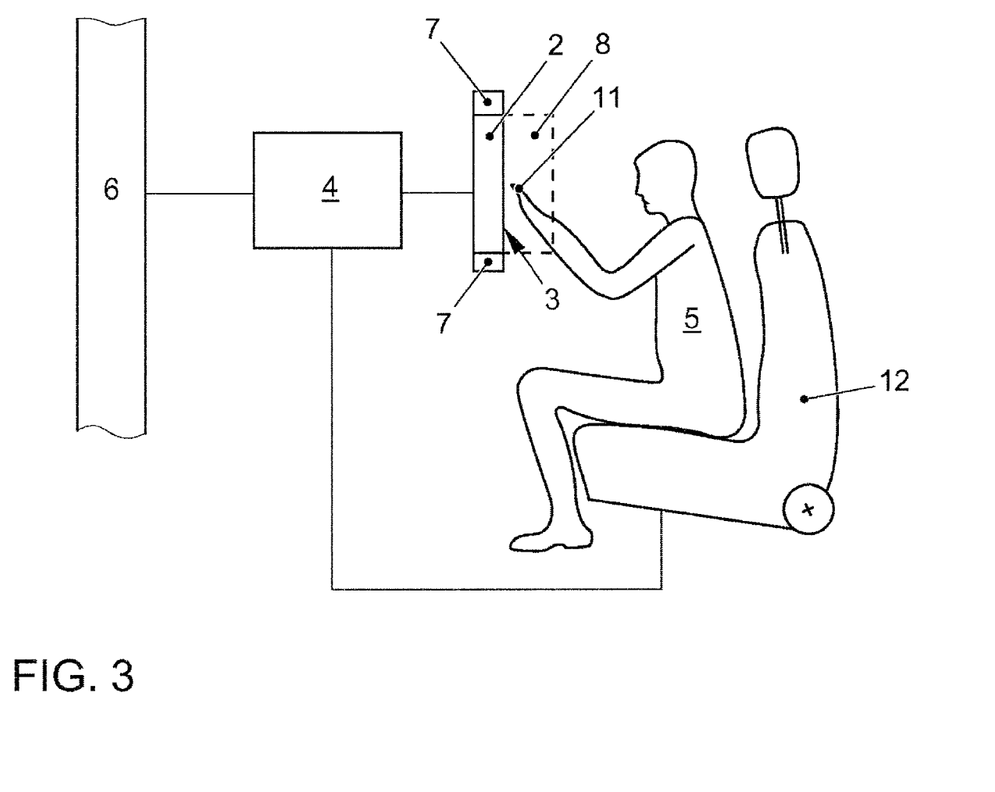
FIG. 3 schematically shows the arrangement of the exemplary embodiment of the apparatus relative to a user.

The design of the disclosed apparatus will be explained with reference to FIGS. 1 to 3:

The apparatus is used to provide a user interface in a vehicle 1. It comprises a display apparatus 2 having a display panel 3. The display panel 3 can be provided by a display of any design. The display panel 3 is arranged in the interior of the vehicle 1 such that it is easily visible to at least one vehicle occupant, particularly the driver 5 who is sitting in the driver's seat 12.

The display apparatus 2 is connected to a control apparatus 4. The control apparatus 4 produces graphics data that are reproduced in a manner visible to the vehicle occupants 5 by means of the display panel 3 in the interior of the vehicle 1.

The control apparatus 4 is additionally connected to a vehicle bus 6. This connection can be used by the control apparatus 4 to interchange data bidirectionally with other devices of the vehicle 1. The control apparatus 4 can have particularly data transmitted to it that the control apparatus 4 processes further such that the display panel 3 is used to produce a display content that assists the driver 5 in controlling the vehicle devices.

In addition, the control apparatus 4 is connected to a memory 13. The memory 13 stores information that can be displayed on the display panel 3. The control apparatus 4 can produce appropriate graphics data therefor for displaying on the display panel 3. In this case, the information is structured in the memory 13 such that lists are formed. In this case, a list comprises a respective multiplicity of list entries. In addition, at least some list entries comprise items. A list entry is therefore also a list that is associated with a different hierarchy level than the list containing the list entries.

In addition, an input apparatus is provided for the user interface. The input apparatus comprises a gesture sensing device 7 that can be used to sense gestures by a user 5 in a sensing space 8. The sensing space 8 is arranged in front of the display panel 3. The driver 5 or another user can make gestures in the sensing space 8 to control the display on the display panel 3 and also further devices of the vehicle, as explained later.

The gesture sensing device 7 can comprise infrared light sources and infrared light detectors, for example. Alternatively, the gesture sensing device 7 can comprise an optical system that comprises a camera that records the gesture made in the sensing space 8. Furthermore, the optical system can comprise a light-emitting diode that emits a square-wave amplitude-modulated light, for example. This light is reflected by the hand of a user 5 making the gesture in the sensing space 8 and, following reflection, arrives at a photodiode of the gesture sensing device 7. A further light-emitting diode likewise emits square-wave amplitude-modulated light to the photodiode, which light is phase-shifted through 180°, however. At the photodiode, the two light signals are superimposed and cancel each other out if they have exactly the same amplitude. If the signals do not cancel each other out at the photodiode, the light emission by the second diode is regulated by means of a control loop such that the total received signal is complemented to produce zero again. If the position of the hand of the user 5 in the sensing space 8 changes, the proportion of light that reaches the photodiode from the first light-emitting diode via the reflection by the hand also changes. This results in the intensity of the second light-emitting diode being tracked by the control loop. The control signal is therefore a measure of the reflection of the light emitted by the first diode by the hand of the user 5 who makes the gesture. In this way, it is possible to derive from the control loop a signal that is characteristic of the position of the hand of the user 5.

The gesture sensing device 7 is connected to the control apparatus 4 and an analysis device 9. The analysis device 9 is additionally connected to the display apparatus 2. The display apparatus 2 transmits the display content to the analysis device 9. On the basis of the currently displayed display content, the analysis device 9 attributes a control command to the sensed gesture. This control command is transmitted by the analysis device 9 to the control apparatus 4, which executes the control command. For this purpose, the control apparatus 4 transmits corresponding data to the vehicle bus 6 and/or changes the display content displayed by the display panel 3.

Further details of the gesture sensing device 7 are described in DE 10 2008 052 485 A1.

The input apparatus may alternatively or additionally comprise a touch-sensitive surface 10 on the display panel 3. Therefore, what is known as a touchscreen is provided.

Figure 4:
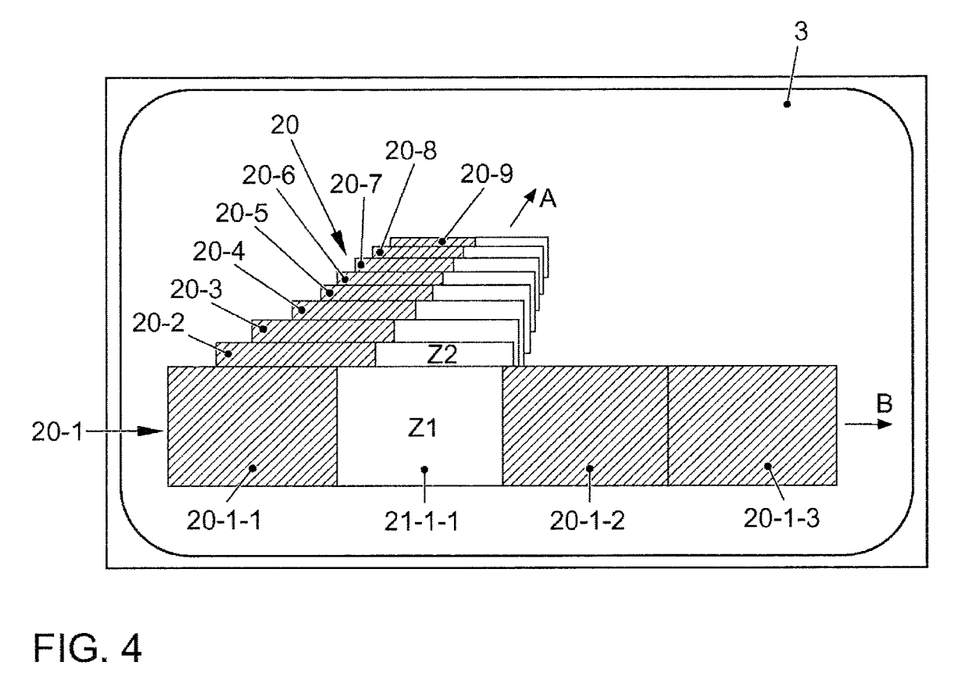
FIG. 4 shows a display that has been produced by an exemplary embodiment of the method.

The disclosed method provides a user interface in the vehicle 1 with reference to FIG. 4. The method can be performed by the apparatus described hereinabove.

The control apparatus 4 produces graphics data for display on the display panel 3, as shown in FIG. 4. The display panel 3 is used to display a subset from the list 20, which is stored in the memory 13, such that the list entries 20-1 to 20-9 extend on the display panel 3 in a first direction A. In this case, the list entries 20-1 to 20-9 are shown such that they are arranged in staggered succession from a perspective point of view. In this arrangement, each of the list entries 20-1 to 20-9 conceals the respective list entries that are arranged behind this list entry from a perspective point of view, so that only the edges of the rear list entries 20-2 to 20-9 are visible. In this case, the list entries 20-1 to 20-9 are a genuine subset of all the list entries associated with the list 20.

For the list entry 20-1 that is shown at the front from a perspective point of view, at least some of the items associated with this list entry 20-1 are furthermore displayed. In the example shown in FIG. 4, the items 20-1-1, 20-1-2 and 20-1-3 are shown in succession. They extend in the direction B on the display panel 3.

For the list entry 20-1, a text field 21-1-1 is additionally displayed that describes the list entry 20-1. By way of example, this text field 21-1-1 may be used to show a reference to a reproduction list to which the list entry 20-1 belongs when the data associated with the list 20 are pieces of music. Corresponding text fields can also be shown in partially concealed form for the further list entries 20-2 to 20-9.

The user can now produce scrolling through the list entries 20-1 to 20-9 in the list 20 and through the items in a particular list entry by means of operator control processes that are sensed by the input apparatus. First of all, input processes that are sensed by the gesture sensing device 7 and evaluated by means of the analysis device 9 will be described.

The user 5 can make a swiping movement with his hand or with his fingertip 11 in the sensing space 8 in a direction that corresponds to the direction A on the display panel 3. The swiping movement is accordingly from the bottom diagonally upward and to the right or in the opposite direction. This swiping gesture is sensed by the input apparatus and transmitted to the control apparatus 4. The latter then produces graphics data that produce scrolling within the list entries in the list 20. If a swiping gesture from the top diagonally downward and to the left is performed, for example, the control apparatus 4 produces graphics data for the display apparatus 2 that prompt the list entry 20-1 and the associated items 20-1-1, 20-1-2 and 20-1-3 to disappear and instead the list entry 20-2 to be displayed in the foreground from a perspective point of view. In addition, a further list entry in the list 20 also appears behind the list entry 20-9 from a perspective point of view. In addition, the items associated with the list entry 20-2 are displayed in the direction B on the display panel 3, as the items 20-1-1, 20-1-2, 20-1-3 associated with the list entry 20-1 were displayed beforehand.

In addition, the user 5 can make a swiping movement from right to left or from left to right in the sensing space 8. On the basis of the display shown in FIG. 4, graphics data are produced in this case that produce scrolling within the items 20-1-1, 20-1-2, 20-1-3 of the list entry 20-1. In the case of a swiping movement from right to left, the item 20-1-1 disappears, for example, and the items 20-1-2 and 20-1-3 move one position to the left. In addition, besides the item 20-1-3, a further item appears that belongs to the list entry 20-1. The text information 21-1-1 remains unchanged in this case.

Instead of swiping movements or swiping gestures, it is correspondingly also possible to perform swiping movements or swiping gestures on the touch-sensitive surfaces 10 of the display panel 3. By way of example, the user 5 can use his fingertip 11 to touch the touch-sensitive surface 10 at an arbitrary location and then make a movement on the touch-sensitive surface 10 in direction A or in direction B. In this case too, the corresponding scrolling through the list entries in the list 20 or through the displayed items in a particular list entry is performed.

For the display of information in a vehicle, the problem arises that very large data pools need to be visualized. By way of example, modern vehicles comprise a large number of driver assistance systems whose information needs to be displayed in the vehicle. Furthermore, vehicles often comprise a navigation system. Such a navigation system can be used to display digital geographical road maps with a route and possibly various supplementary information. Finally, modern vehicles comprise communication and multimedia applications, including a mobile telephone interface and devices for reproducing music and speech. These applications also require the vehicle to have the opportunity to display information. In this case, very specific demands arise for the display of information in a vehicle and for the operator control of the various devices of the vehicle. The assimilation of information and the operator control are carried out in the vehicle by the driver, inter alia. The information should therefore be presented in the vehicle such that the assimilation of information by the driver does not result in distraction during the journey. The presented information should therefore be able to be picked up by the driver intuitively and quickly, so that the assimilation of information requires him to take his eyes off the driving scenario only very briefly. Equally, operator control of the vehicle devices needs to be able to be performed as simply and intuitively as possible, so that the driver can also operate the devices during the journey. If operator control of a display is supported or conducted, the display should be effected such that the operator control requires the driver to look at the display only very briefly to perform the operator control.

To be able to display the various information flexibly, user-programmable displays are used, for example, which frequently also undertake the reproduction of conventional mechanical instruments. By way of example, DE 10 2006

032 118 A1 describes a combination instrument for a motor vehicle that comprises a display that can be used to display the speed of the motor vehicle, the speed of the engine of the motor vehicle, the temperature of the engine of the motor vehicle, the tank fill and/or the time in a variable manner. Furthermore, it is possible to display information from a navigation system, from a telephone, from a music installation, from an infotainment system and/or from an air conditioning installation.

In addition to the combination instrument, a display apparatus is often arranged above the central console of the vehicle and can be used to display further information. This display apparatus is used particularly as a multifunction display and for presenting a geographical map from a navigation system. Such a multifunction display is described in DE 199 41 956 A1, for example.

By way of example, information is presented in a vehicle by virtue of a subset of total information being displayed on the display panel in the vehicle and the user being able to alter the subset. By way of example, the total information can relate to a list having a multiplicity of list entries. From the total list, a subset of the list entries is displayed. An operator control process allows the user to prompt scrolling to display other list entries. By way of example, the operator control process can involve the user performing an operator control movement of a particular length. In addition, the user can operate an operator control element for a particular operating period, for example. The magnitude or dimension of the alteration of the displayed information, i.e. in this case the number of positions by which the list entries that are displayed change, is in this case dependent on the length of the operator control movement or of the operating period.

DE 10 2008 052 485 A1 discloses a method for displaying information in which a subset from a list that comprises a multiplicity of list entries is displayed on a display panel. The method involves the displayed subset from the list being altered by a first operator control process by a user, the first operator control process moving through the list entries in the list in succession. In addition, the method involves a second operator control process skipping a plurality of list entries to get to a list entry that is not contained in the displayed subset of the list entries that have been displayed during execution of the second operator control process. In this case, the first operator control process comprises control of a movement by a list entry in a first direction and the second operator control process comprises control of a movement by a list entry in a second direction, which is different than the first direction.

LIST OF REFERENCE SYMBOLS

1 Vehicle
2 Display apparatus
3 Display panel
4 Control apparatus
5 User, driver
6 Data bus
7 Gesture sensing device
8 Sensing space
9 Analysis device
10 Touch-sensitive surface
11 Operating object, fingertip of the user
12 Driver's seat
13 Memory
20 List
20-1 to 20-9 List entries
20-1-1 to 20-1-3 Items in the list entry 20-1
21-1-1 Text information

The invention claimed is:

1. A method for providing a user interface for control of an infotainment system in a transportation vehicle, wherein gesture-based user input controls operation of the user interface to control functionality of the infotainment system included in the transportation vehicle, and wherein infotainment system related information is structured in five lists displayed to the user via the user interface, the method comprising:

displaying each of the five lists, wherein each list comprises a plurality of infotainment system related list entries, wherein each of the plurality of infotainment system related list entries pertains to a particular functionality of the infotainment system, wherein each of the plurality of infotainment system related list entries comprises a plurality of items that each relate to the corresponding functionality of the infotainment system of the infotainment system related list entry, wherein a display panel is used to display the plurality of infotainment system related list entries in the displayed lists so that each of the plurality of infotainment system related list entries in each of the five lists extends in a first direction from a perspective point of view on the display panel, wherein the list entries of each of the five lists are shown from a perspective point of view such that the list entries are arranged in staggered succession, wherein each of the list entries of each of the five lists partly conceals respective list entries arranged behind this list entry from a perspective point of view, whereby only edges of the most rear list entries are visible on the display panel, and whereby only a list entry that is shown in each list at a front from a perspective point of view has the subset of the items in this one list entry displayed, wherein the plurality of items included in an infotainment system related list entry included in the displayed plurality of infotainment system related list entries are displayed so the plurality of items extend in a second direction on the display panel, wherein the second direction is different than the first direction and is perpendicularly oriented relative to the first direction;

altering the displayed list of the plurality of infotainment system related list entries in response to a first operator control process by the user sensed by a gesture sensing device so the infotainment system related list entries in the displayed list are moved through in succession, wherein the first operator control process comprises an operator control movement, which is a swipe gesture in the first direction in a sensing space in front of the display panel; and altering the displayed list of the plurality of items in the displayed one infotainment system related list entry in response to a second operator control process by the user sensed by the gesture sensing device so the items in the infotainment system related list entry are moved through in succession, wherein the second operator control process comprises an operator control movement in the second direction in a sensing space in front of the display panel, whereby two-dimensional, gesture-based operator control of the user interface operation is enabled such that the first and second directions are distinguishable from one another by the user and associated with corresponding directions of gestures made by the user in the sensing space in front of the display panel, wherein the displayed plurality of infotainment system related list entries are displayed and selected in the first direction and controlled by user gestures detected in the first direction input to specify infotainment system functionality for selection by the user in the sensing space in front of the display panel via the gesture sensing device and the displayed items in the displayed infotainment system related list entry are displayed and selected in the second direction by user gestures detected in the second direction input to specify item selection for a specified infotainment system functionality by the user in the sensing space in front of the display panel via the gesture sensing device, and wherein the alteration of the displayed list of the plurality of infotainment system related list entries in response to the first operator control process alters the displayed plurality of infotainment system related list entries such that a list entry shown at the front from a perspective point of view and the associated items disappear and, instead, a next list entry is displayed in a foreground from a perspective point of view and the items associated with this next list entry are displayed on the display panel in the second direction, as the items associated with the list entry shown at the front from a perspective point of view were displayed previously.

2. The method of claim 1, wherein the first operator control process is used to scroll through the infotainment system related list entries in the displayed list and the second operator control process is used to scroll through the items in a infotainment system related list entry in the displayed list.

3. The method of claim 1, wherein at least one operator control process is performed in response to the gesture sensing device detecting a movement on a touch-sensitive surface.

4. The method of claim 1, wherein at least one operator control process is performed in response to a movement in a sensing space in front of the display panel being sensed.

5. The method of claim 1, wherein the items in the one infotainment system related list entry in the displayed list are shown next to one another.

6. A gesture-based user interface in a transportation vehicle configured to control functionality of an infotainment system included in the transportation vehicle, wherein gesture-based user input controls operation of the user interface to control functionality of the infotainment system, the user interface comprising:
- a display including a display panel for displaying infotainment system related information structured in five lists displayed to the user;
- a memory for storing the five lists which each comprise a plurality of infotainment system related list entries, wherein each of the plurality of infotainment system related list entries pertains to a particular functionality of the infotainment system, wherein each of the plurality of infotainment system related list entries comprises a plurality of items that each relate to the corresponding functionality of the infotainment system of the infotainment system related list entry, wherein each of the plurality of infotainment system related list entries are displayed with the plurality of items for the infotainment system related list entry on the display panel;
- a gesture sensing device for sensing operator control processes by a user to control alteration of displayed infotainment system related list entries and displayed items; and
- a controller coupled to the display and to the memory and by which the display panel is controlled based on the operator control process, wherein the controller controls the display panel is to display the plurality of infotainment system related list entries in the displayed lists so that each of the plurality of infotainment system related list entries in each of the five lists extends in a first direction from a perspective point of view on the display panel, wherein the list entries of each of the five lists are shown from a perspective point of view such that the list entries are arranged in staggered succession, wherein each of the list entries of each of the five lists partly conceals respective list entries arranged behind this list entry from a perspective point of view, whereby only edges of the most rear list entries are visible on the display panel, and whereby only a list entry that is shown in each list at a front from a perspective point of view has the subset of the items in this one list entry displayed, wherein the plurality of items included in an infotainment system related list entry included in the displayed plurality of infotainment system related list entries are displayed so the plurality of items extend in a second direction on the display panel, wherein the second direction is different than the first direction and is perpendicularly oriented relative to the first direction, wherein the displayed list of the plurality of infotainment system related list entries is altered in response to a first operator control process by the user sensed by a gesture sensing device so the infotainment system related list entries in the displayed list are moved through in succession, wherein the first operator control process comprises an operator control movement, which is a swipe gesture in the first direction in a sensing space in front of the display panel, wherein the displayed list of the plurality of items in the displayed one infotainment system related list entry is altered in response to a second operator control process by the user sensed by the gesture sensing device so the items in the infotainment system related list entry are moved through in succession, wherein the second operator control process comprises an operator control movement in the second direction in a sensing space in front of the display panel, whereby two-dimensional, gesture-based operator control of the user interface operation is enabled such that the first and second directions are distinguishable from one another by the user and associated with corresponding directions of gestures made by the user in the sensing space in front of the display panel, wherein the displayed plurality of infotainment system related list entries are displayed and selected in the first direction and controlled by user gestures detected in the first direction input to specify infotainment system functionality for selection by the user in the sensing space in front of the display panel via the gesture sensing device and the displayed items in the displayed infotainment system related list entry are displayed and selected in the second direction by user gestures detected in the second direction input to specify item selection for a specified infotainment system functionality by the user in the sensing space in front of the display panel via the gesture sensing device, and wherein the alteration of the displayed list of the plurality of infotainment system related list entries in response to the first operator control process alters the displayed plurality of infotainment system related list entries such that a list entry shown at the front from a perspective point of view and the associated items disappear and, instead, a next list entry is displayed in a foreground from a perspective point of view and the items associated with this next list entry are displayed on the display panel in the second direction, as the items associated with the list entry shown at the front from a perspective point of view were displayed previously.

7. The apparatus of claim 6, wherein the gesture sensing device comprises a touch-sensitive surface.

8. A transportation vehicle having a user interface and an infotainment system in the transportation vehicle, wherein gesture-based user input controls operation of the user interface controls functionality of the infotainment system, and wherein the user interface comprises:
- a display including a display panel for displaying infotainment system related information structured in five lists displayed to the user;
- a memory for storing the five lists which each comprise a plurality of infotainment system related list entries, wherein each of the plurality of infotainment system related list entries pertains to a particular functionality of the infotainment system, wherein each of the plurality of infotainment system related list entries comprises a plurality of items that each relate to the corresponding functionality of the infotainment system of the infotainment system related list entry, wherein each of the plurality of infotainment system related list entries are displayed with the plurality of items for the infotainment system related list entry on the display panel;
- a gesture sensing device for sensing operator control processes by a user to control alteration of displayed infotainment system related list entries and displayed items; and
- a controller coupled to the display and to the memory and by which the display panel is controlled based on the operator control process, wherein the controller controls the display panel is to display the plurality of infotainment system related list entries in the displayed lists so that each of the plurality of infotainment system related list entries in each of the five lists extends in a first direction from a perspective point of view on the display panel, wherein the list entries of each of the five lists are shown from a perspective point of view such that the list entries are arranged in staggered succession, wherein each of the list entries of each of the five lists partly conceals respective list entries arranged behind this list entry from a perspective point of view, whereby only edges of the most rear list entries are visible on the display panel, and whereby only a list entry that is shown in each list at a front from a perspective point of view has the subset of the items in this one list entry displayed,
- wherein the plurality of items included in an infotainment system related list entry included in the displayed plurality of infotainment system related list entries are displayed so the plurality of items extend in a second direction on the display panel, wherein the second direction is different than the first direction and is perpendicularly oriented relative to the first direction,
- wherein the displayed list of the plurality of infotainment system related list entries is altered in response to a first operator control process by the user sensed by a gesture sensing device so the infotainment system related list entries in the displayed list are moved through in succession, wherein the first operator control process comprises an operator control movement, which is a swipe gesture in the first direction in a sensing space in front of the display panel,
- wherein the displayed list of the plurality of items in the displayed one infotainment system related list entry is altered in response to a second operator control process by the user sensed by the gesture sensing device so the items in the infotainment system related list entry are moved through in succession, wherein the second operator control process comprises an operator control movement in the second direction in a sensing space in front of the display panel, whereby two-dimensional, gesture-based operator control of the user interface operation is enabled such that the first and second directions are distinguishable from one another by the user and associated with corresponding directions of gestures made by the user in the sensing space in front of the display panel,
- wherein the displayed plurality of infotainment system related list entries are displayed and selected in the first direction and controlled by user gestures detected in the first direction input to specify infotainment system functionality for selection by the user in the sensing space in front of the display panel via the gesture sensing device and the displayed items in the displayed infotainment system related list entry are displayed and selected in the second direction by user gestures detected in the second direction input to specify item selection for a specified infotainment system functionality by the user in the sensing space in front of the display panel via the gesture sensing device, and
- wherein the alteration of the displayed list of the plurality of infotainment system related list entries in response to the first operator control process alters the displayed plurality of infotainment system related list entries such that a list entry shown at the front from a perspective point of view and the associated items disappear and, instead, a next list entry is displayed in a foreground from a perspective point of view and the items associated with this next list entry are displayed on the display panel in the second direction, as the items associated with the list entry shown at the front from a perspective point of view were displayed previously.

9. The user interface of claim 6, wherein the first operator control process is used to scroll through the infotainment system related list entries in the displayed list and the second operator control process is used to scroll through the items in a infotainment system related list entry in the displayed list.

10. The user interface of claim 6, wherein at least one operator control process is performed in response to the gesture sensing device detecting a movement on a touch-sensitive surface.

11. The user interface of claim 6, wherein at least one operator control process is performed in response to a movement in a sensing space in front of the display panel being sensed.

12. The user interface of claim 6, wherein the items in the one infotainment system related list entry in the displayed list are shown next to one another.

13. The transportation vehicle of claim 7, wherein the first operator control process is used to scroll through the infotainment system related list entries in the displayed list and the second operator control process is used to scroll through the items in a infotainment system related list entry in the displayed list.

14. The transportation vehicle of claim 7, wherein at least one operator control process is performed in response to the gesture sensing device detecting a movement on a touch-sensitive surface.

15. The transportation vehicle of claim 7, wherein at least one operator control process is performed in response to a movement in a sensing space in front of the display panel being sensed.

16. The transportation vehicle of claim 7, wherein the items in the one infotainment system related list entry in the displayed list are shown next to one another.

* * * * *